April 30, 1968  P. H. G. VAN VLODROP  3,381,288
APPARATUS FOR THE REMOTE INDICATION OF THE
POSITION OF A ROTARY SHAFT
Filed March 21, 1963  3 Sheets-Sheet 1

INVENTOR.
PETER H.G. VAN VLODROP

BY
AGENT

April 30, 1968  P. H. G. VAN VLODROP  3,381,288
APPARATUS FOR THE REMOTE INDICATION OF THE
POSITION OF A ROTARY SHAFT
Filed March 21, 1963  3 Sheets-Sheet 2

INVENTOR.
PETER H.G. VAN VLODROP
BY
*Frank R. Trifari*
AGENT

April 30, 1968     P. H. G. VAN VLODROP     3,381,288
APPARATUS FOR THE REMOTE INDICATION OF THE
POSITION OF A ROTARY SHAFT Filed March 21, 1963     3 Sheets-Sheet 3

INVENTOR
PETER H.G. VAN VLODROP

BY
AGENT

United States Patent Office 3,381,288
Patented Apr. 30, 1968

3,381,288
APPARATUS FOR THE REMOTE INDICATION OF THE POSITION OF A ROTARY SHAFT
Peter Hubertus Gerardus van Vlodrop, Eindhoven, Netherlands, assignor to North American Philips Company, Inc., New York, N.Y., a corporation of Delaware
Filed Mar. 21, 1963, Ser. No. 266,917
Claims priority, application Netherlands, Mar. 23, 1962, 276,353
19 Claims. (Cl. 340—324)

This invention relates to apparatus for indicating the position of a rotary shaft, more particularly to an analogue-to-digital converter which provides an accurate digital indication of shaft position utilizing photosensitive elements. The invention is especially useful for indicating the shaft position of a machine tool, or the like.

The novel apparatus comprises a disc which accurately follows the rotary movement of the shaft and is provided with a number of apertures arranged in a circle concentric with the axis of rotation. The disc is irradiated by a source of light rays which can pass through the apertures and illuminate a plurality of photosensitive elements disposed behind the apertures in a predetermined arrangement.

It is an object of the present invention to provide apparatus of the aforementioned kind by means of which a numerical indication is simply and reliably obtained. It is a further object of the invention to provide an optical shaft position converter which requires fewer photosensitive elements than the actual number of shaft position increments to be displayed.

It is also an object of the invention to provide optical shaft converter apparatus having means for preventing ambiguous indications of the shaft position at transition points in the display.

Arrangements are known in which a disc is provided with a circle of apertures or slits along its entire circumference through which a beam of light may pass. The disc is mounted on the shaft to be encoded and the light rays passing through the apertures in the disc strike a photoelectric element arranged behind the disc. Thus pulses are produced in the circuits in which the photoelement is connected. The pulses produced are applied to a counter and the number of pulses counted in a given period of time is a measure of the angle through which the shaft has been rotated during that period. Such arrangements are comparatively complicated and not always reliable because pulses may be skipped in the counting process.

According to the invention, a plurality of photoelectric elements are arranged in two or more rings having different radii. In a preferred embodiment of the invention, a number of photoelectric elements, preferably ten elements, are uniformly distributed about a first ring of a particular radius. A disc mounted on the shaft to be encoded preferably has a single aperture located at approximately the same radius so that light passing through this aperture will sequentially strike the ten photoelectric elements previously mentioned. The disc also has a number of apertures, preferably ten apertures, which are uniformly distributed along a second ring of a different radius. The associated photoelectric elements of the second ring are arranged in a circle having a radius approximately equal to that of the group of ten apertures in the disc. The elements are arranged so that upon rotation of the disc through an angle which is equal to the angle between two adjacent photoelectric elements of the first ring, all of the photoelectric elements of the second circle are irradiated in succession. The output currents produced by these photoelectric elements are used to control a suitable numerical indicating device. If the second ring comprises ten apertures and ten photoelectric elements, an indication comprising two figures in the decimal system of notation may be obtained. Obviously the number of rings of apertures in the disc and the number of rings of stationary photoelectric elements may be increased so that an indication comprising three or more figures may be obtained.

The rings may extend over an entire circle or over a part thereof. The latter disposition is useful where rotation of the disc through part of a circle only is to be measured, as is the case, for example, in weighing apparatus.

The entire rotary disc is irradiated by a source of light. In order to keep the penetration of unwanted light striking the photoelectric elements to a minimum, it is a further feature of the invention to position a second stationary disc immediately behind the rotary disc. The second disc is also provided with a plurality of apertures behind which the photoelectric elements are arranged.

The photoelectric elements may be arranged side by side so that they are successively irradiated through a single aperture in the rotary disc. However, in order to better utilize the available space it is advantageous to distribute the photoelectric elements of the second ring over its entire circumference. Therefore, upon rotation of the disc the photoelectric elements are successively irradiated through different apertures in the rotary disc. In this manner the overall size of the assembly may be made considerably smaller.

The photoelectric elements may in turn serve to ignite gas-filled discharge tubes by connecting them in circuit with the ignition electrodes of these tubes. The cathode light emitted by the discharge tube may be used as the digital indication of the shaft position. Preferably, however, a numerical indicator is provided in the form of a gas discharge tube having a common anode and a plurality of cathodes which are used for the indication. Each cathode may be connected to the anode of a discharge tube controlled by a photoelectric element. In each of these cases the anodes are preferably supplied with interrupted direct current.

In order that the invention may be readily understood and practiced, particular embodiments thereof will now be described, by way of example, with reference to the accompanying diagrammatic drawings, in which.

Figure 1A:
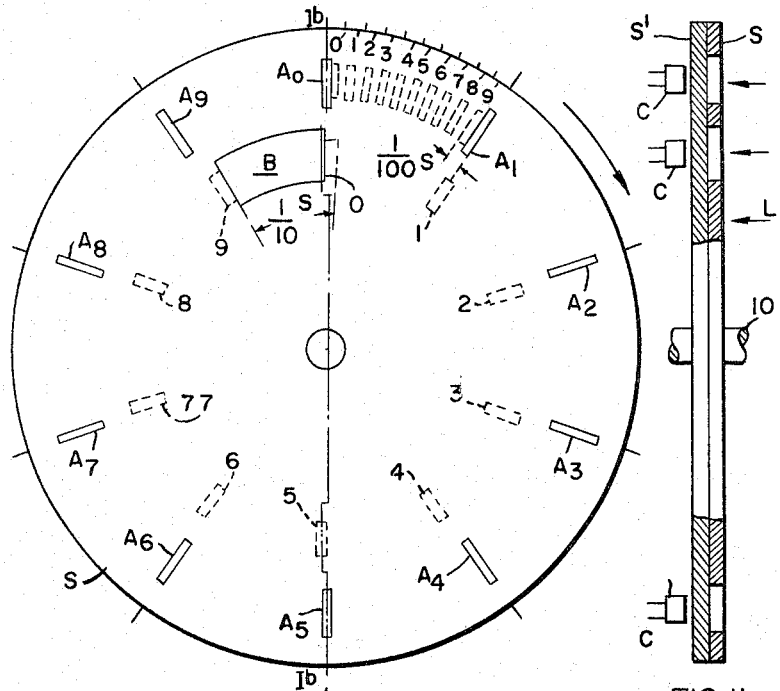
FIGS. 1a and 1b illustrate one embodiment of the invention comprising an apertured disc shown coupled to a shaft and the arrangement of the photoelectric elements.
Figure 1B:
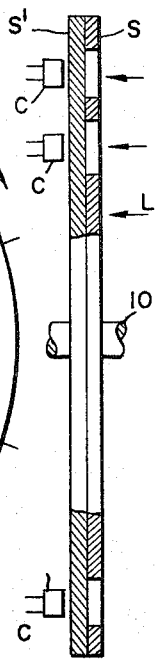

The arrangement shown in FIGS. 1a and 1b comprise two similar circular discs S and S'. The front disc S is directly secured to the rotary shaft 10 whose position is to be indicated. The disc S' is secured in position between the rotary disc S and the photoelectric elements C. The apertures in disc S' are aligned with the photoelectric element C to pass the light rays passing through the apertures in rotary disc S, while simultaneously reducing unwanted light rays to a minimum. It will of course be obvious that a second arrangement is possible in which the fixed disc S' could be mounted in front of rotary disc S, instead of behind it as in FIG. 1b, providing the apertures in disc S' are properly aligned with the photoelectric elements C. FIG. 1a is a plan view and FIG. 1b a side elevation of the first arrangement. The apparatus shown is suitable to provide a numerical indication of the position of the shaft as a number comprising two decimal figures.

The two discs, S and S', are provided with elongated radial apertures. The apertures are arranged in two rings of different radii. The apertures in the front disc S are shown as blank rectangles in FIG. 1a. The apertures in the rear disc S', behind which the photoelectric cells are arranged, are shown in dotted lines. The cells may be photoconductive cells using cadmium sulphide as the photo-conductive material. A source of light not shown, is positioned in front of the disc S so as to irradiate the entire disc. The light rays L pass through the aligned apertures in the discs S and S' and strike one of the photoelectric elements whenever two apertures of discs S and S' register during rotation of the front disc.

The photoelectric cells which serve to indicate the first or higher order digit of the two place decimal number which indicates the position of the shaft comprise the inner ring and are designated by the numerals 0–9. For this digit only a single aperture B is provided in the rotary disc S. The width of this aperture is about equal to the tangential or arcuate distance between two adjacent photoelectric elements of the first or inner ring. Therefore, at any one instant only one cell in this ring can be irradiated.

The photoelectric cells which serve to indicate the second or lower order digit of the desired number form part of the outer ring. They are numbered from 0'–9'. In this outer ring the rotary disc S has ten slits $A_0$–$A_9$ distributed substantially uniformly about the circumference of the disc. The tangential width of each of these slits is about equal to the spacing between two apertures in the outer ring of stationary disc S'. Therefore, upon rotation of the disc S, two photoelectric cells of the second or outer ring can never be irradiated simultaneously, yet the transition from one cell to the next is effected substantially without any blank intervals in the display.

In FIG. 1 the discs are shown in the transition position between the numbers 99 and 00. In this position no light falls on any of the photoelectric cells. When the front disc S is rotated slightly counterclockwise, light will pass through the slits $A_1$ and B illuminating the cells 9 and 9' of each decade. When the disc S is rotated slightly clockwise from the position shown, the cells 0 and 0' in each ring are irradiated through the apertures B and $A_0$, respectively. The cells comprising the first decade (outer ring) are spaced apart by a distance equal to one hundredth part of the circumference of the outer ring. The cells for the second decade (inner ring) are spaced apart by a distance equal to one tenth part of the circumference of the inner ring. By rotating the disc S through one hundredth part of its circumference the next cell of the first decade will always be irradiated, whereas a rotation through one tenth part of the circumference is required to pass from one cell to the next in the second decade. In this case, for satisfactory operation of the device, the width of a slit in the front disc S plus the width of a slit in the rear disc S' should preferably be one hundredth part of the circumference of the outer ring for the first decade, and one tenth part of the circumference of the inner ring for the second decade. If this arc is made greater, two cells in the same decade will be irradiated simultaneously resulting in an ambiguous indication of the shaft position. If the arc is smaller, upon rotation of the disc, small transition areas exist between cells wherein no cell will be irradiated. In this case, no indication will result and the shaft position will be unknown. Altogether, twenty photoelectric cells are required for two decades.

Figure 2:
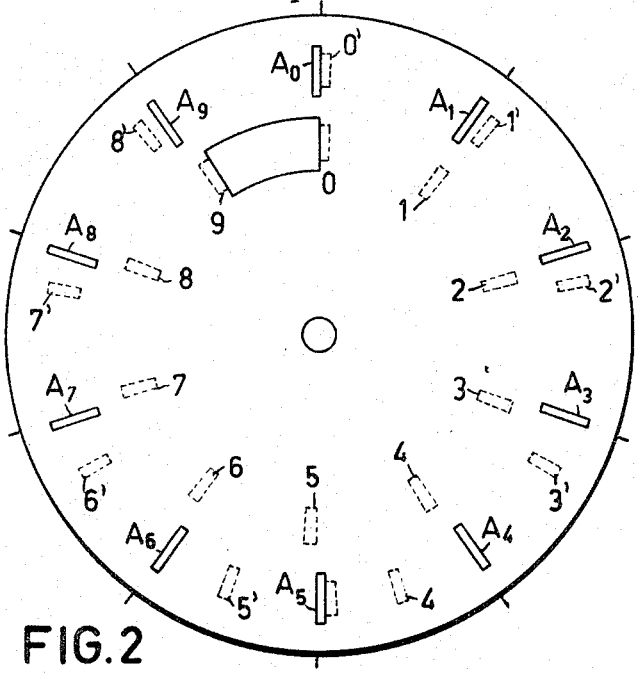
FIG. 2 illustrates an alternate embodiment of the invention wherein the photoelectric elements of the outer ring are distributed throughout the entire circumference of the circle to provide a more compact assembly.

As FIG. 1 shows, the cells 0'–9' of the first decade (outer ring) may be equally spaced from one another. The smallest possible diameter of the disc S will therefore be determined by the size of the cells. The smaller the cells and the mutual spacings therebetween, the smaller the diameter of the disc can be made. In an alternative embodiment of the invention, the cells of the first decade may be distributed along the circumference of the outer ring such that each interval between two adjacent apertures in the rotary disc corresponds to a single photoelectric element, and yet upon rotation of the disc through one tenth part of its circumference, each of the outer ring cells is successively irradiated. FIG. 2 shows this latter embodiment in which the apertures in the stationary disc S' and the photoelectric cells are shifted with respect to the apertures in disc S in the aforementioned manner in contrast to the embodiment shown in FIG. 1. The spacing between adjacent apertures 0', 1', 2', etc. in disc S' (and also the spacing between the associated photo-electric cells) successively increase by one one-hundredth of the circumference of the outer ring, resulting in the staggered relationship of the elements shown in FIG. 2. Alternatively, the spacing between the cells of the outer ring may be made equal, and the cells uniformly distributed about the circumference of the ring, but the spacing between the apertures in rotary disc S may be staggered in a manner similar to that of the photocells previously described. Upon clockwise rotation of the disc S in FIG. 2 through one hundredth part of its circumference, aperture $A_0$ in the outer ring of disc S will transmit light rays to illuminate photocell 0'. An additional clockwise rotation of disc S through another one hundredth part of its circumference results in the illumination of photocell 1' by means of aperture $A_1$ in disc S. Successive rotation of disc S through successive increments of arc result in the successive illumination of photocells 2', 3', etc. by apertures $A_2$, $A_3$, etc., respectively. Therefore, by means of the arrangement shown in FIG. 2, the discs may be made smaller. Furthermore, it has been found that by the use of a suitable material for the photo-conductive layers of the photocells the sensitivity will nevertheless be sufficient.

Figure 3:
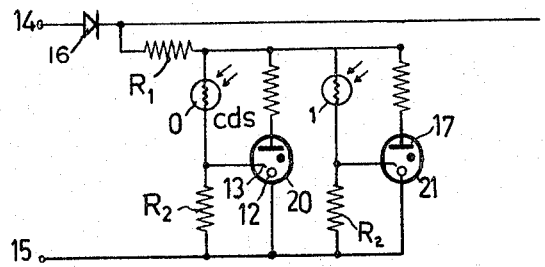
FIGS. 3 and 4 illustrate schematically the control and indicating circuits responsive to the electric pulses produced by the irradiated photoelectric elements.

The indicating elements may be controlled by the currents produced in the circuits of the photocells as will be evident by reference to FIG. 3. FIG. 3 shows one form of circuit arrangement adapted to be controlled by the photoelectric elements. For each decade there is provided a set of ten tubes, 20, 21, etc. For illustrative purposes, only two of the ten tubes of a decade are shown in the figure. The tubes shown in FIG. 3 are gas-discharge tubes having cold cathodes 12 and provided with ignition electrodes 13. They are supplied with interrupted or pulsating direct current obtained from the alternating current source by means of the half wave rectification produced by diode 16, so that the gas tubes are periodically extinguished. The source of alternating current is applied to terminals 14 and 15. The photosensitive elements 0, 1, etc. are included in the circuits of the ignition electrodes of the tubes 20, 21. Photo-sensitive elements 0, 1, etc. may comprise photoconductive cells which have two electrodes between which a layer of activated cadmium sulphide is interposed. All of the ignition electrodes are supplied through a common resistor R1 from the same source as the anodes 17. For each tube there is connected in series with resistor R1 a Cds photocell 0, 1 and a resistor R2. The ignition electrode is connected to the junction point of resistor R2 and photocell 0, 1, etc. Whenever a photocell is irradiated its resistance decreases thereby raising the voltage at the ignition electrode to a value such that an auxiliary discharge is produced between this electrode and the cathode. This auxiliary discharge in turn initiates the discharge between the anode and the cathode. The resistor R1 serves to limit the currents flowing in the input circuit when the resistance of one of the photoconductive cells is low, thereby preventing the cells from being over-loaded. The ignition of the tubes requires only a very small ignition current in the input circuits. Therefore, if a photocell is used which has a dark resistance of 200 megohms and a resistance upon irradiation of 50,000 ohms, the resistor R2 may have a value of the order of 10 megohms. A comparatively weak illumination will produce a change of resistance in the photocells of this order of magnitude, hence the sizes of the discs may be relatively small.

Figure 4:
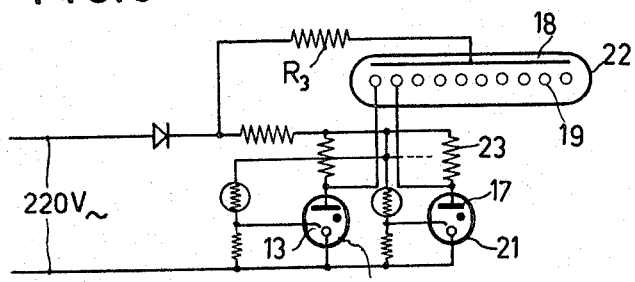

The cathode light produced in the gas-discharge tubes 20, 21 may be viewed directly to indicate the shaft position. Preferably, the tubes 20, 21 are used solely as amplifiers. The actual indication means for a single decade is effected by means of an appropriate decade tube 22 having ten cathodes and a single anode, in the manner shown in FIG. 4. The anode 18 is supplied through a resistor $R_3$ from the same voltage source as the cold cathode tubes 20, 21 and the ignition electrodes 13. The cathodes 19 of tube 22 are individually connected to the anodes 17 of the cold cathode tubes. The anodes 17 are connected to the supply source through resistors 23. Upon irradiation of a photoelectric cell the associated tube 20, 21 is ignited so that its anode voltage is reduced to a value such that a discharge is also produced between the anode 18 and the associated cathode 19 of the indicating tube 22, thereby indicating the relevant figure. The cathodes of the indicating tube 22 may be shaped in a known manner in the form of the numerals zero to nine, the cathode light displaying the correct numeral.

Figure 5:
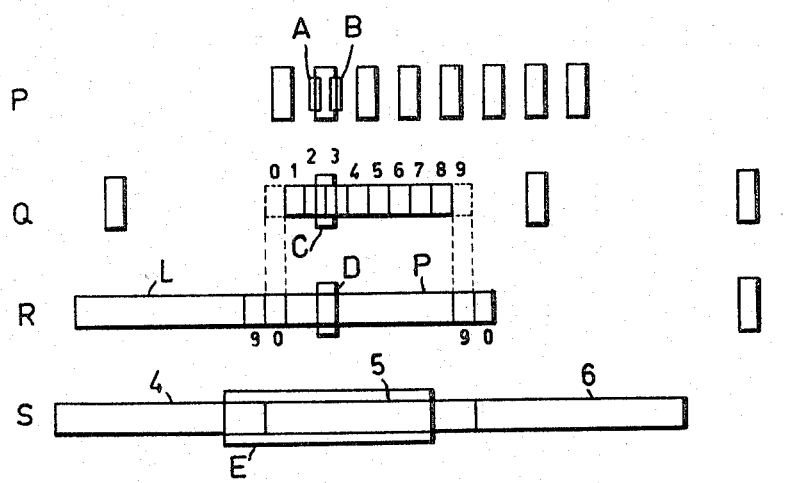
FIG. 5 illustrates another arrangement of the photoelectric elements and devices exhibiting improved operating characteristics.

In the arrangement described above with reference to FIGS. 1 and 2, the size of the disc and the disposition of the photoelectric elements are comparatively critical, so that in some cases two tubes of a single decade may be ignited simultaneously. This problem may be obviated to a certain extent by supplying the anodes of the cold cathode tubes through a single resistor. A further problem encountered is that the transistion from nine to zero (i.e. photocells 9' to 0') in the first or lower order decade may not always occur at the same instant as the corresponding transition between digits in the second or higher order decade. FIGURE 5 shows a modified arrangement of the apparatus of FIG. 1 which eliminates these problems. In this arrangement, if all of the photocells for the first decade are arranged within the arc between two adjacent slits, as in FIG. 1, the partitions between the strips and the apertures in the stationary disc may be omitted so as to form a single aperture behind which the photocells are arranged side by side. In this case, at the point of transition from one cell to the adjacent cell in the first decade, both cells are always irradiated simultaneously.

According to this latter feature of the invention, a third ring of apertures P is provided on a third circle of the rotary disc. Behind these apertures two photocells A and B are arranged at a distance from one another such that at each transition from one cell to the next in the first decade, a change in the amount of light also occurs from one of the two cells A, B to the other. These two photocells are connected in a circuit by means of which one photocell controls the supply voltage for the gas-discharge tubes associated with the first decade photocells of odd order. The second photocell controls the supply voltage for the first decade gas-discharge tubes associated with photocells of even order. As will become apparent from the discussion to follow, photocells A and B control the gas-discharge tubes in a manner such that either the even group of gas-discharge tubes or the odd group of gas-discharge tubes will be ignited at any particular position of the rotary disc, but not both. Therefore, due to the control exercised by photocells A and B, only one of the two gas-discharge tubes associated with successive photocells of the first decade can be in the ignited condition at any particular instant of time. The next tube in the ring can only be ignited after the relative amount of irradiation of the two photocells A and B has been changed.

Figure 6:
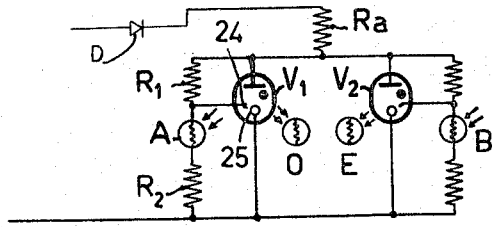
FIGS. 6, 7 and 9 illustrate control circuits adapted for use with the arrangement of FIG. 5.
Figure 7:
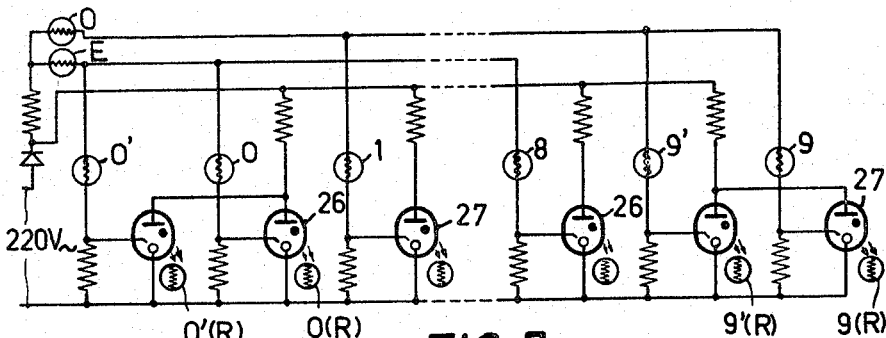

In FIG. 5 the third ring of apertures is designated by J. These apertures are located around the circumference of the rotary disc and, in the case where a three decimal display is desired and the first or lowest order decade sub-divides the disc circumference into 1000 increments of arc, comprise 500 apertures behind which two photocells A and B are arranged in alignment therewith. The spacing between the photocells A and B is equal to the width of a single aperture in the ring P. FIG. 6 illustrates the use of photocells A and B as part of a bistable circuit comprising cold cathode tubes V1 and V2 which are in optical coupling arrangement with photoconductors O and E. As shown in FIG. 7, the photoconductor O may be connected in the supply lead for the ignition electrodes of all the tubes of odd order in the first decade and the photoconductor E may be connected in the supply lead for ignition electrodes of all the tubes of even order. Returning to FIG. 6, tubes V1 and V2 have a common anode resistor $Ra$ so that at any one instant of time only one of the tubes can be ignited. The operation of the circuit of FIG. 6 is such that when photoconductor A is irradiated its resistance is low and the ignition electrode 24 of tube V1 is therefore at a relatively low potential with respect to its cathode 25. At the same instant the photoconductor B is in the dark so that the potential of the ignition electrode of the tube V2 is high with respect to that of its cathode. Under these conditions, the tube V1 passes no current and the tube V2 passes current so that the photoconductor O has a high resistance and the photoconductor E has a low resistance. At each change in the irradiation of the cells A and B during rotation of the disc, the condition of the bistable circuit of FIG. 6 is reversed. FIG. 7 shows a circuit diagram of the supply arrangement for the cold cathode tubes and the associated ignition electrodes which will be described more fully hereafter. Whenever the resistance of the photocell A in FIG. 6 is lower than that of the photocell B, photocell E is irradiated and its resistance is lower than that of photocell O. In this event, only the even figures of the first decade can be displayed since photocell E controls the supply voltage to the ignition electrodes of the even order gas-discharge tubes 26 in FIG. 7. In a similar manner, whenever the resistance of photocell B is lower than that of photocell A, photocell O is irradiated and its resistance is then lower than that of photocell E. In this case, photocell O will only allow an odd order gas-discharge tube 27 to conduct.

Referring again to FIG. 5, the ring Q (associated with the first decade of the display) in the rotary disc comprises 100 equally spaced apertures C. In the condition shown the photocells 2 and 3 of the ring Q are both irradiated, but only one of them can cause the corresponding figure in the first decade to luminese due to the control exerted by photocells A and B in ring P, as can be seen from FIG. 7. When the rotary disc is moved slightly to the right, the resistance of the cell B will decrease, and therefore the resistance of photocell O, so that the FIGURE 2 disappears from the display, not shown, and the FIGURE 3 emits light. The correct instant of transition depends upon the accuracy of the slits and the photoelements of the outer ring P. The maximum deviation from the required position of a slit in the ring Q can be one half of the width of the slit without giving rise to an error. When the first disc is rotated to the right through an angle corresponding to one thousandth part of the circumference, the cell A is irradiated again with greater intensity than the cell B, and in the first decade of FIG. 7 the supply voltage is switched from odd to even. At this time the aperture C covers one half of the photocells 3 and 4 of the ring Q.

A similar technique can be used with respect to the second decade which in this case sub-divides the disc circumference into 100 increments of arc in a manner corresponding to the first decade of FIG. 1. In FIG. 5 three of the required ten photoelectric elements are shown which are numbered 4, 5 and 6. They form part of a ring which is designated by the letter S. The associated apertures in the rotary disc are designated by E. It is assumed that the assembly comprises ten such apertures and ten corresponding photoelectric elements. A ring R, similar in purpose to ring P, includes two stationary photoelectric elements, L and P. The associated ring of the rotary disc comprises fifty apertures D which are evenly distributed around the circumference of the disc and through which, upon rotation of the disc, the light rays successively impinge upon the photocells L and P. The photoelements L and P perform a similar function in the second decade to that performed by the photoelements A and B in the first decade (ring P).

Figure 9:
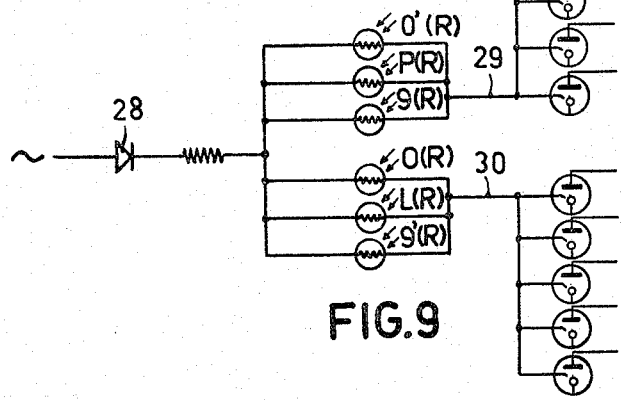

The problem mentioned above that a transition from one figure to another in the second or higher order decade may not be effected simultaneously with the transition from 9 to 0 in the first or lower order decade can be obviated by omitting the two outer elements of the ring Q, which correspond to the figures 0 and 9, and which are shown in broken lines in FIG. 5. Instead, there is interposed in the ring R photo-electric elements 9' and 0' between the elements L and P. In addition, photoelectric elements 9 and 0 are located at the other end of the element P in FIG. 5. The circuit connections of the photoelectric elements 9, 9' and 0, 0' in the circuit arrangement of the first decade are shown in FIG. 7.

Figure 8:
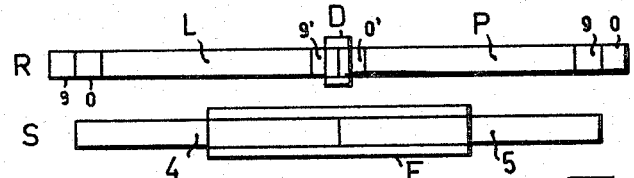
FIG. 8 illustrates one particular operating condition of the arrangement of FIG. 5.

FIG. 8 shows one position of the disc in which the aperture D in ring R is exactly aligned with the photoelectric elements 9' and 0' and the aperture E in ring S is midway above two photoelectric elements 4 and 5. In this arrangement, two other photoelectric elements 9 and 0 may also be disposed at the left hand end of the element L. The position of the disc shown in FIG. 8 is the point of transition from the number 49 to the number 50.

FIG. 9 shows the supply leads for the ignition electrodes of the gas-discharge tubes of odd and even order for the second decade. The tube electrodes are also supplied with interrupted direct current by means of a rectifier diode 28 and through a number of photoelectric cells. The upper lead 29 serves to supply the tubes of odd order and the lower lead 30 serves to supply the tubes of even order. The circuit arrangement to which leads 29 and 30 are connected may be similar to that shown in FIG. 7 for the first decade. However, since such connections will be obvious to one skilled in the art, they have been omitted from FIG. 9 for the sake of clarity. The photocells P (R) and L (R) have the same function in the second decade as the photocells 0 and E have in the first decade of FIG. 7. The cells L and P below the disc are irradiated through comparatively narrow apertures D. Consequently, they can never be irradiated simultaneously. Irradiation of photocell L insures that only an even order digit of the second decade will be displayed, whereas irradiation of photocell P allows only odd order digits to be displayed.

The photocells 9' and 0' of ring R control two gas-discharge tubes of the first decade (FIG. 7) which are optically coupled to the photo-cells 9' (R) and 0' (R) of the control and display circuits of the second decade in FIG. 9. At any given instant only one of the cells 9' (R) or 0' (R) can be irradiated because in the first decade only a single gas-discharge tube can be operative at any one time due to the control exercised by the ring P, the photocells A and B and the odd and even photo-cells 0 and E of FIG. 7. The photocells 9 and 0 in FIG. 5 control two other gas-discharge tubes of the first decade. As shown in FIG. 7 the tube controlled by the photocell 9 is connected in parallel with the tube controlled by photo-cell 9' and similarly, the tubes controlled by photo-cells 0 and 0' are parallel connected, so that each pair of parallel connected gas tubes control the same figure of the first decade. The first decade gas-discharge tubes controlled by the photo-cells 9 and 0 of ring R are optically coupled to photo-cells 9 (R) and 0 (R). As shown in FIG. 9, the photo-cell 9 (R) is connected in series with the lead 29 through which the ignition electrodes of odd order in the second decade are supplied and the cell 0 (R) is connected in the supply lead 30 for the ignition electrodes of even order. As described above for photo-cells 9' (R) and 0' (R), at any one instant only one of the photo-cells 9 (R) or 0 (R) can be irradiated, due to the control exercised by odd and even photo-cells 0 and E in FIG. 7.

Two pairs of adjacent cells 9', 0' and 9, 0 are required because for a given number, for example the number 49, the nine (i.e. photo-cells 9' and 9' (R)) must ensure that in the second decade an even FIGURE (4) will be displayed. However, one decade further, that is to say in the position 59, the nine (i.e. photocells 9 and 9 (R)) must ensure that only an odd FIGURE (5) will luminesce in the second decade. It is therefore seen that by removing the photoelements for the digits 9 and 0 from the first or lower order decade and placing them in the ring R of the second decade in the manner shown and by providing that the same aperture D in ring R which controls the switching action from one digit to the next in the second decade also simultaneously controls the switching action from the digit nine to the digit zero in the first decade, both decades must be changed simultaneously and the possibility of ambiguous indications at the transition points between decades is eliminated.

Other modifications of the invention described herein will become apparent to those of ordinary skill in the art. For example, it is obvious that the apparatus described may be extended to include many more decades if increased accuracy is desired. It is therefore intended that the matter contained in the foregoing description and the accompanying drawings are merely illustrative, the scope of the invention being defined in the appended claims.

What is claimed is:

1. Apparatus for indicating the rotary position of a shaft comprising a disc operatively coupled to said shaft for rotation about an axis, said disc being provided with a first aperture located at a first radial distance from said axis of rotation and a plurality of other apertures arranged in a circle about said axis at a second radial distance therefrom and radially non-aligned with respect to said first aperture so that substantially no radial overlap exists between said other apertures and said first aperture, a source of light arranged to irradiate one surface of said disc, a plurality of photoelectric elements arranged in first and second circles of different radii, said disc being interposed between said light source and said photoelectric elements, said photoelectric elements of said first circle being uniformly disposed over at least a part of the circumference of said circle and being disposed in substantial alignment with said first aperture in said disc, said photoelectric elements of said second circle being disposed over at least a part of the circumference of said second circle and being disposed in substantial alignment with said other apertures in said disc, the photoelectric elements of said first and second circles being relatively disposed so that upon rotation of the disc through an angle corresponding to the angle between two adjacent photoelectric elements of said first circle all of the photoelectric elements in said second circle are successively irradiated by said light source, and indicating means responsive to the output electrical energy of said photoelectric elements and coupled thereto.

2. Apparatus as described in claim 1 and further comprising a second disc fixedly mounted between said light source and said photoelectric elements, said second disc having a first plurality of apertures arranged in individual alignment with the photo-electric elements of said first circle and a second plurality of apertures arranged in individual alignment with the photoelectric elements of said second circle.

3. An optical shaft converter for indicating the rotary position of a shaft as a number comprising, a source of light, first and second groups of photoelectric elements uniformly spaced about a portion of the circumference of first and second coaxial circles of different radii, respectively, a disc interposed between said light source and said photoelectric elements and rotatable about a given axis in synchronism with said shaft, said disc having a single aperture located at a first radial distance from said axis in alignment with said first group of photoelectric elements and a plurality of other apertures arranged in a circle about said axis at a second radial distance therefrom in alignment with said second group of photoelectric elements, the photoelectric elements of said first and second groups being disposed relative to one another and to said apertured disc so that upon rotation of the disc through an angle equal to the angle subtended by two adjacent photoelectric elements of said first circle all of the photoelectric elements of said second group are successively illuminated by said light source, and visual display means comprising first and second groups of digit indicator elements individually coupled to said first and second groups of photoelectric elements, respectively, for indicating said shaft position as a plural digit number.

4. A converter as described in claim 3 wherein said disc further comprises another plurality of apertures uniformly arranged in a second circle about said axis at a third radial distance therefrom, first and second photoelectric elements positioned adjacent one another in substantial alignment with the apertures of said second circle, said first and second photoelectric elements being positioned relative to one another and to the second group of photoelectric elements, and said apertures of said second circle being positioned relative to the apertures of said first circle so that upon rotation of the disc the light transition region between adjacent photoelectric elements of said second group coincides with the light transition region of said first and second photoelectric elements, said display means further comprising control means coupled to said first and second photoelectric elements and arranged to selectively produce first and second control signals in mutually exclusive time intervals in accordance with the illumination of said first and second photoelectric elements, and means for coupling said first and second control signals to the even and odd order digit indicator elements, respectively, of said second group of indicator elements, said first and second photo-electric elements cooperating with the photoelectric elements of said second group to control the energization of said second group of digit indicator elements.

5. Apparatus for providing a decimal system indication of the rotary position of a shaft comprising a disc rotatably mounted about an axis and operatively coupled to said shaft to follow the rotary movement thereof, said disc being provided with a first aperture located at a first radial distance from said axis of rotation and ten other apertures uniformly distributed about the circumference of a circle concentric with said axis of rotation and at a second radial distance therefrom, a source of light arranged to irradiate one surface of said disc, a plurality of photoelectric elements arranged in first and second circles of different radii and concentric with said axis of rotation, said second circle comprising ten photoelectric elements, said photoelectric elements of said first circle being uniformly distributed about the circumference of said first circle in substantial alignment with said first aperture in said disc, said disc being interposed between said light source and said photoelectric elements, said photoelectric elements of said second circle being distributed over at least a part of the circumference thereof in substantial alignment with said other apertures in said disc and arranged to cooperate with said disc to effectively divide the disc circumference into a number of equal increments of arc which is greater than the number of photoelectric elements in said second circle, the photoelectric elements of said first and second circles being disposed relative to each other so that for each successive irradiation of a photoelectric element in the first circle ten photoelectric elements in the second circle are successively irradiated by said light source, and indicating means responsive to the output electrical energy supplied by said photoelectric elements for numerically displaying said shaft position in a decimal system of notation.

6. Apparatus as described in claim 5 wherein the radial distance of said first aperture from the axis of rotation is substantially equal to the radius of said first circle of photoelectric elements and wherein the radial distance of said other apertures from said axis is substantially equal to the radius of said second circle of photoelectric elements.

7. Apparatus as described in claim 5 wherein said disc is further provided with third and fourth circles of apertures located at third and fourth radial distances from said axis, a pair of first and second photoelectric elements positioned in substantial alignment with the apertures in said third circle, third and fourth photoelectric elements positioned in substantial alignment with the apertures in said fourth circle, the outer two photoelectric elements of said second circle being omitted therefrom and mounted in substantial alignment with the apertures in said fourth circle, said outer two photoelectric elements being connected in circuit with the photoelectric elements of said second circle to control the transition of said display from one digit to the next in said first circle while simultaneously controlling the transition of said display in said second circle from the digit nine to the digit zero, said first and second photoelectric elements of said third circle being connected in circuit with the photoelectric elements of said second circle so as to selectively display odd or even order photoelectric elements thereof in mutually exclusive time intervals, and means conducting said third and fourth photoelectric elements in circuit with the photoelectric elements of said first circle so as to selectively display the odd or even order photoelectric elements of said first circle in mutually exclusive time intervals.

8. Apparatus for providing a decimal system indication of the rotary position of a shaft comprising, a disc rotatably mounted about an axis and operatively coupled to said shaft to follow the rotary movement thereof, said disc including a first aperture located at a first radial distance from said axis of rotation and ten other apertures uniformly distributed about the circumference of a circle concentric with said axis of rotation and at a second radial distance therefrom, a source of light arranged to irradiate one surface of said disc, a plurality of photoelectric elements arranged in first and second circles of different radii concentric with said axis of rotation, each of said first and second circles comprising ten photoelectric elements, said photoelectric elements of said first circle being uniformly distributed about the circumference of said first circle in substantial alignment with said first aperture, said disc being interposed between said light source and said photoelectric elements, all of the photoelectric elements of said second circle being uniformly distributed within an arc formed by a pair of adjacent photoelectric elements of said first circle and the axis of rotation of said disc and in substantial alignment with said other apertures, the photoelectric elements of said first and second circles being disposed relative to each other so that for each successive irradiation of a photoelectric element in the first circle ten photoelectric elements in the second circle are successively irradiated by said light source, and indicating means responsive to the output electrical energy supplied by said photoelectric elements for numerically displaying said shaft position in a decimal system of notation.

9. Apparatus for providing a decimal system indication of the rotary position of a shaft comprising a disc rotatably mounted about an axis and operatively coupled to said shaft to follow the rotary movement thereof, said disc being provided with a first aperture located at a first radial distance from said axis of rotation and ten other apertures uniformly distributed about the circumference of a circle concentric with said axis of rotation and at a second radial distance therefrom, a source of light arranged to irradiate one surface of said disc, a plurality of photoelectric elements arranged in first and second circles of different radii and concentric with said axis of rotation, each of said first and second circles comprising ten photoelectric elements, said photoelectric elements of said first circle being uniformly distributed about the circumference of said first circle in substantial alignment with said first aperture upon rotation of said disc, said disc being interposed between said light source and said photoelectric elements, said photoelectric elements of said second circle being distributed about the circumference thereof so that the arcuate spacing between corresponding photoelectric elements of said first and second circles, measured between the corresponding radial lines passing therethrough, progressively varies about the disc circumference, said photoelectric elements of said second circle being disposed for alignment with said other apertures in said disc, the photoelectric elements of said first and second circles being disposed relative to each other so that for each successive irradiation of a photoelectric element in the first circle ten photoelectric elements in the second circle are successively irradiated by said light source, and indicating means responsive to the output electrical energy supplied by said photoelectric elements for numerically displaying said shaft position in a decimal system of notation.

10. Apparatus for providing a decimal system indication of the rotary position of a shaft comprising a disc rotatably mounted about an axis and operatively coupled to said shaft to follow the rotary movement thereof, said disc being provided with a first aperture located at a first radial distance from said axis of rotation and ten other apertures distributed about the circumference of a circle concentric with said axis of rotation and at a second radial distance therefrom, a source of light arranged to irradiate one surface of said disc, a plurality of photoelectric elements arranged in first and second circles of different radii and concentric with said axis of rotation, each of said first and second circles comprising ten photoelectric elements, said photoelectric elements of said first and second circles being uniformly distributed about the circumference thereof in alignment with said first aperture and said other apertures, respectively, of said disc, said disc being interposed between said light source and said photoelectric elements, the apertures in said circle of said second radial distance being distributed about the circumference thereof so that the spacing therebetween progressively varies in a given manner, the photoelectric elements of said first and second circles being disposed relative to each other so that for each successive irradiation of a photoelectric element in the first circle ten photoelectric elements in the second circle are successively irradiated by said light source, and indicating means responsive to the output electrical energy supplied by said photoelectric elements for numerically displaying said shaft position in a decimal system of notation.

11. Apparatus for indicating the rotary position of a shaft comprising a disc rotatably mounted about an axis and operatively coupled to said shaft to follow the rotary movement thereof, said disc being provided with a first plurality of apertures arranged in a circle about said axis at a first radial distance therefrom and a plurality of other apertures arranged in a second circle about said axis and related to the apertures in said first circle in a predetermined manner, a source of light arranged to irradiate one surface of said disc, a plurality of photoelectric elements uniformly distributed over at least a part of the circumference of a first circle and in substantial alignment with said first plurality of apertures, a pair of first and second photoelectric elements positioned in substantial alignment with said other apertures, said disc being interposed between said light source and said photoelectric elements, said first and second photoelectric elements being spaced apart from each other and disposed relative to the photoelectric elements of said first circle so that a transition in irradiation from one photoelectric element to the adjacent photoelectric element of the first circle upon rotation of said disc is simultaneously accompanied by a change of irradiation from one of said first and second photoelectric elements to the other, and indicating means responsive to the electric energy supplied by said photoelectric elements for displaying said shaft position as a numerical indication, and indicating means comprising digit display means having a plurality of odd and even order digit indicating elements corresponding to the photoelectric elements of said first circle and bistable circuit means coupled to said first and second photoelectric elements for selectively energizing the odd or even order digit indicating elements in mutually exclusive time intervals.

12. Apparatus for indicating the rotary position of a shaft comprising a disc rotatably mounted about an axis and operatively coupled to said shaft to follow the rotary movement thereof, a source of light arranged to illuminate one surface of said disc, a plurality of photoelectric elements uniformly distributed over at least a part of the circumference of a first circle, said disc being interposed between said light source and said photoelectric elements, said disc being provided with a first plurality of apertures arranged in a circle about said axis at a first radial distance therefrom and arranged to register with said photoelectric elements upon rotation of said disc, said photoelectric elements and said apertures being arranged to divide the circumference of said disc into a predetermined number of equal increments, said disc being provided with a plurality of other apertures arranged in a second circle about said axis and equal to one half said number of equal increments, a pair of first and second photoelectric elements positioned in substantial alignment with said other apertures, said first and second photoelectric elements being spaced apart from each other and disposed relative to the photoelectric elements of said first circle and said disc so that a transition in illumination from one photoelectric element to the adjacent photoelectric element of the first circle upon rotation of said disc is simultaneously accompanied by a bistable circuit means coupled to said first and second photoelectric elements to the other, and indicating means responsive to the electric energy supplied by said photoelectric elements for displaying said shaft position as a numerical indication, said indicating means comprising bistable circuit means coupled to said first and second photoelectric elements and having first and second states corresponding to the relative levels of illumination of said first and second photoelectric elements, respectively, said first state of said bistable circuit means allowing only even order photoelectric elements of said first circle to be displayed and said second state of said bistable circuit means allowing only odd order photoelectric elements of said first circle to be displayed.

13. Apparatus for indicating the rotary position of a shaft comprising a disc operatively coupled to said shaft for rotation about an axis, said disc being provided with a first rectangular shaped aperture located at a first radial distance from said axis of rotation and a plurality of other rectangular shaped apertures arranged in a circle about said axis at a second radial distance therefrom, a source of light arranged to irradiate one surface of said disc, a plurality of photoelectric elements arranged in first and second circles of different radii, said disc being interposed between said light source and said photoelectric elements, said photoelectric elements of said first circle being uniformly distributed about the circumference of said circle and being disposed in substantial alignment with said first aperture in said disc, said photoelectric elements of said second circle being uniformly disposed over at least a part of the circumference of said second circle in substantial alignment with said other apertures in said disc, the width of said first aperture being approximately equal to the arcuate distance between adjacent photoelectric elements in said first circle, the width of each of said other apertures being approximately equal to the arcuate distance between adjacent photoelectric elements of said second circle, the photoelectric elements of said first and second circle being disposed relative to one another so that upon rotation of the disc through an angle corresponding to the angle between two adjacent photoelectric elements of said first circle all of the photoelectric elements of said second circle are successively irradiated by said light source, and indicating means responsive to the output electrical energy of said photoelectric elements and coupled thereto.

14. Apparatus as described in claim 13 wherein said first aperture is positioned so as to lie entirely within the angle subtended at the axis by two adjacent apertures of the circle of second radial distance so that substantially no radial overlap exists between said first aperture and said two adjacent apertures.

15. An optical shaft converter for indicating the rotary position of a shaft as a number having a plurality of digits comprising, a source of light, first and second groups of photoelectric elements arranged about the circumference of first and second coaxial circles of different radii, respectively, a disc interposed between said light source and said photoelectric elements and rotatable about a given axis in synchronism with said shaft, said disc having a first aperture located at a first radial distance from said axis in alignment with said first group of photoelectric elements and a plurality of other apertures arranged in a circle about said axis at a second radial distance therefrom in alignment with said second group of photoelectric elements, said photoelectric elements and said apertured disc being arranged so as to effectively divide the disc circumference into a given number of equal increments of arc, the photoelectric elements of said first and second groups being disposed relative to one another and to said apertured disc so that upon rotation of the disc through an angle equal to the angle subtended by two adjacent photoelectric elements of said first circle all of the photoelectric elements of said second group are successively illuminated by said light source, and numerical display means coupled to said photoelectric elements for indicating said shaft position as a plural digit number.

16. A converter as described in claim 15 wherein all of the photoelectric elements of said second group are uniformly distributed within an arc which is substantially less than the full circumference of said second circle and wherein the number of photoelectric elements in said second group is less than said given number of increments of arc.

17. A converter as described in claim 15 wherein said disc further comprises another plurality of apertures arranged in a second circle about said axis at a third radial distance therefrom, first and second photoelectric elements positioned in substantial alignment with the apertures of said second circle, said first and second photoelectric elements being positioned relative to one another and to the second group of photoelectric elements so that the transition region between adjacent photoelectric elements of said second group coincides with the transition region of said first and second photoelectric elements, and means coupled to said first and second photoelectric elements for controlling the energization of said numerical display means so as to selectively display the odd or even order photoelectric elements of said second group in mutually exclusive time intervals.

18. An optical shaft converter for indicating the rotary position of a shaft as a number having a plurality of digits comprising, a source of light, first and second groups of photoelectric elements arranged about the circumference of first and second coaxial circles of different radii, respectively, a disc interposde between said light source and said photoelectric elements and rotatable about a given axis in synchronism with said shaft, said disc having a first aperture located at a first radial distance from said axis in alignment with said first group of photoelectric elements and a plurality of other apertures arranged in a circle about said axis at a second radial distance therefrom in alignment with said second group of photoelectric elements, the photoelectric elements of said second group being distributed about the circumference of said second circle so that the arcuate spacing between corresponding photoelectric elements of said first and second circles, measured between the corresponding radial lines passing therethrough, progressively varies by a given increment of arc, the photoelectric elements of said first and second groups being disposed relative to one another and to said apertured disc so that upon rotation of the disc through an angle equal to the angle subtended by two adjacent photoelectric elements of said first circle all of the photoelectric elements of said second group are successively illuminated by said light source, and numerical display means coupled to said photoelectric elements for indicating said shaft position as a plural digit number.

19. A converter as described in claim 18 wherein said numerical display means comprises first and second groups of gas discharge tubes having anode and ignition electrodes, means for individually coupling the photoelectric elements of said first and second groups to the ignition electrodes of said first and second groups of discharge tubes, respectively, and means for supplying interrupted direct current to the anodes of said discharge tubes.

References Cited
UNITED STATES PATENTS

| | | | |
|---|---|---|---|
| 2,169,818 | 8/1939 | Scott | 315—209 |
| 2,265,149 | 12/1941 | Crane et al. | 250—231 |
| 2,659,066 | 11/1953 | Sayer | 340—188 |
| 2,747,797 | 5/1956 | Beaumont | 340—347 |
| 2,788,519 | 4/1957 | Caldwell | 340—271 |
| 3,024,986 | 3/1962 | Strianese et al. | 340—282 |
| 3,164,819 | 1/1965 | Rantsch et al. | 340—324 |

FOREIGN PATENTS

| | | |
|---|---|---|
| 932,135 | 7/1963 | Great Britain. |

JOHN W. CALDWELL, *Primary Examiner.*

NEIL C. READ, *Examiner.*

A. J. KASPER, *Assistant Examiner.*